(12) United States Patent
Yu et al.

(10) Patent No.: US 7,953,581 B2
(45) Date of Patent: May 31, 2011

(54) SYSTEM, METHOD AND APPARATUS FOR SENSITIVITY BASED FAST POWER GRID SIMULATION WITH VARIABLE TIME STEP

(75) Inventors: Michael Yu, Santa Clara, CA (US); Alexander I. Korobkov, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 405 days.

(21) Appl. No.: 12/142,273

(22) Filed: Jun. 19, 2008

(65) Prior Publication Data
US 2009/0319250 A1 Dec. 24, 2009

(51) Int. Cl.
*G06F 17/50* (2006.01)

(52) U.S. Cl. ................... 703/2; 703/6; 703/14

(58) Field of Classification Search ................ 703/2, 17, 703/19, 6, 14
See application file for complete search history.

(56) References Cited

U.S. PATENT DOCUMENTS

| 2007/0244676 | A1* | 10/2007 | Shang et al. | 703/2 |
| 2008/0072182 | A1* | 3/2008 | He et al. | 716/2 |
| 2009/0234630 | A1* | 9/2009 | Clement | 703/14 |

OTHER PUBLICATIONS

Jiří Vlach and Kishore Singhal, *Computer Methods For Circuit Analysis And Design*, Van Nostrand Reinhold, New York, NY, Second Edition (1994), pp. 294-320, ISBN 0-442-01194-6.

* cited by examiner

*Primary Examiner* — Thai Phan
(74) *Attorney, Agent, or Firm* — Martine Penilla & Gencarella, LLP

(57) ABSTRACT

A system and method of analyzing a power grid in an integrated circuit includes inputting a circuit design to a test bench, inputting a plurality of initial values for the circuit design in to the test bench, setting a current time t to 0 value for an initial time ($t_0$) of the operation of the circuit design, representing each capacitor in an RC circuit corresponding to the power grid circuit design by the each capacitor's respective time variant equivalent companion model, describing each one of the plurality of RC equivalent circuits mathematically as one of a corresponding plurality of linear equations, storing the plurality of linear equations in a matrix $Y_0$ for time $t_0$, resolving the matrix $Y_0$ to determine a DC operating point, updating the RC equivalent circuits and the corresponding plurality of linear equations at a second time step $t_1 = t + h$ where h is a time step value equal to the current time t and a next simulated operation time, storing the updated plurality of linear equations in a matrix $Y_1$ for time $t_1$, inverting the matrix $Y_1$ to form inverted matrix $Y_1^{-1}$, resolving the inverted matrix $Y_1^{-1}$, calculating a new time step and setting the current time t to t+h, comparing the new time step h to a plurality of time steps in a time step database, selecting one of the plurality of time steps substantially equal to the new time step and recalling a solution corresponding to the selected time step.

11 Claims, 7 Drawing Sheets

SYSTEM, METHOD AND APPARATUS FOR SENSITIVITY BASED FAST POWER GRID SIMULATION WITH VARIABLE TIME STEP

BACKGROUND

The present invention relates generally to integrated circuit simulation and testing, and more particularly, to systems, methods and apparatus for analyzing simulations of power grid performance in an integrated circuit simulation.

Integrated circuit design has many phases one such phase is the simulation of the design. During the simulation phase, the operation of the integrated circuit is simulated including, for example, simulated logic processing, signal transmission and signal reception. The timing of the integrated circuit design is also simulated.

The simulation of the integrated circuit is performed in a computer known as a test bench. The test bench also includes software for testing the operations of the simulated integrated circuit.

One of the operational aspects of the integrated circuit simulation that is tested is the power grid loads and voltage drops at certain nodes throughout the integrated circuit design. The load on the power grid of the integrated circuit is determined by the number of devices coupled to and drawing power from the power grid and the operation of those devices at the time the test.

By way of example, each device typically draws maximum current when the device changes states. Therefore, the maximum load and the corresponding voltage drop on the power grid is a related to the operational timing of the devices coupled to the power grid. The relative loads and corresponding voltage drops are therefore determined at the selected time intervals during the simulation.

The number of devices on an integrated circuit is ever increasing. Present generations of integrated circuits have millions (and even billions) of devices. The requirement of simulating the local loads and corresponding voltage drops caused by the operations of millions of devices can require several days for the test bench to complete. Further, the simulation and power grid analysis must be repeated each time the integrated circuit design is modified.

The power grid analysis consumes too much time and significantly increases the design cycle time for integrated circuits. In view of the foregoing, there is a need for a system, method and apparatus for reducing the time required for the power grid analysis.

SUMMARY

Broadly speaking, the present invention fills these needs by providing a system and method for analyzing power grid performance of an integrated circuit design. It should be appreciated that the present invention can be implemented in numerous ways, including as a process, an apparatus, a system, computer readable media, or a device. Several inventive embodiments of the present invention are described below.

One embodiment provides a method of analyzing a power grid in an integrated circuit includes inputting a circuit design to a test bench, inputting a plurality of initial values for the circuit design in to the test bench, setting a current time t to 0 value for an initial time ($t_0$) of the operation of the circuit design, direpresenting each capacitor in an RC circuit corresponding to the power grid circuit design by the each capacitor's respective time variant equivalent companion model, describing each one of the plurality of RC equivalent circuits mathematically as one of a corresponding plurality of linear equations, storing the plurality of linear equations in a matrix $Y_0$ for time $t_0$, resolving the matrix $Y_0$ to determine a DC operating point, updating the RC equivalent circuits and the corresponding plurality of linear equations at a second time step $t_1 = t + h$ where h is a time step value equal to the current time t and a next simulated operation time, storing the updated plurality of linear equations in a matrix $Y_1$ for time $t_1$, inverting the matrix $Y_1$ to form inverted matrix $Y_1^{-1}$, resolving the inverted matrix $Y_1^{-1}$, calculating a new time step and setting the current time t to t+h, comparing the new time step h to a plurality of time steps in a time step database, selecting one of the plurality of time steps substantially equal to the new time step and recalling a solution corresponding to the selected time step.

Comparing the new time step h to the plurality of time steps in the time step database can include calculating a time step difference. Calculating the time step difference can include selecting a local truncation error. Calculating the time step difference can also include determining a difference between each one of the plurality of time steps and the current time step and selecting one of the plurality of time steps that has a corresponding difference less than or equal the local truncation error. Recalling the solution corresponding to the selected time step can include resolving the matrix using the recalled solution.

Another embodiment provides a method of analyzing a power grid in an integrated circuit. The method includes inputting a circuit design to a test bench, inputting a plurality of initial values for the circuit design in to the test bench, setting a current time t to 0 value for an initial time ($t_0$) of the operation of the circuit design, representing each capacitor in an RC circuit corresponding to the power grid circuit design by the each capacitor's respective time variant equivalent companion model, describing each one of the plurality of RC equivalent circuits mathematically as one of a corresponding plurality of linear equations, storing the plurality of linear equations in a matrix $Y_0$ for time $t_0$, resolving the matrix $Y_0$ to determine a DC operating point, updating the RC equivalent circuits and the corresponding plurality of linear equations at a second time step $t_1 = t + h$ where h is a time step value equal to the current time t and a next simulated operation time, storing the updated plurality of linear equations in a matrix $Y_1$ for time $t_1$, inverting the matrix $Y_1$ to form inverted matrix $Y_1^{-1}$, resolving the inverted matrix $Y_1^{-1}$, calculating a new time step and setting the current time t to t+h, comparing the new time step h to a plurality of time steps in a time step database including calculating a time step difference, selecting a local truncation error, determining a difference between each one of the plurality of time steps and the current time step and selecting one of the plurality of time steps that has a corresponding difference less than or equal the local truncation error, selecting one of the plurality of time steps substantially equal to the new time step, recalling a solution corresponding to the selected time step and resolving the matrix using the recalled solution.

Yet another embodiment provides a system for analyzing a power grid in an integrated circuit including a computer, computer readable logic for inputting a circuit design to the computer, computer readable logic for inputting a plurality of initial values for the circuit design in to the test bench, computer readable logic for setting a current time t to 0 value for an initial time ($t_0$) of the operation of the circuit design, computer readable logic for representing each capacitor in an RC circuit corresponding to the power grid circuit design by the each capacitor's respective time variant equivalent companion model, computer readable logic for describing each one of the plurality of RC equivalent circuits mathematically as one of a corresponding plurality of linear equations, computer readable logic for storing the plurality of linear equations in a matrix $Y_0$ for time $t_0$, computer readable logic for resolving the matrix $Y_0$ to determine a DC operating point, computer readable logic for updating the RC equivalent circuits and the corresponding plurality of linear equations at a second time step $t_1=t+h$ where h is a time step value equal to the current time t and a next simulated operation time, computer readable logic for storing the updated plurality of linear equations in a matrix $Y_1$ for time $t_1$, computer readable logic for inverting the matrix $Y_1$ to form inverted matrix $Y_1^{-1}$, computer readable logic for resolving the inverted matrix $Y_1^{-1}$, computer readable logic for calculating a new time step and setting the current time t to t+h, computer readable logic for comparing the new time step h to a plurality of time steps in a time step database, computer readable logic for selecting one of the plurality of time steps substantially equal to the new time step and computer readable logic for recalling a solution corresponding to the selected time step.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Several exemplary embodiments for a system and method for analyzing power grid performance of an integrated circuit design will now be described. It will be apparent to those skilled in the art that the present invention may be practiced without some or all of the specific details set forth herein.

The present invention provides improved simulation performance for a full integrated circuit power grid. The simulation is performed in the form of transient analysis for user defined time range. During the transient analysis each time dependant electrical element is discretized (i.e., simplified to an equivalent conductance circuit) at each simulation time. The transient analysis of each electrical circuit provides a matrix of linear equations. The matrix of linear equations can be solved for the state variables (e.g., voltages at selected nodes) at each simulation time.

Figure 1:
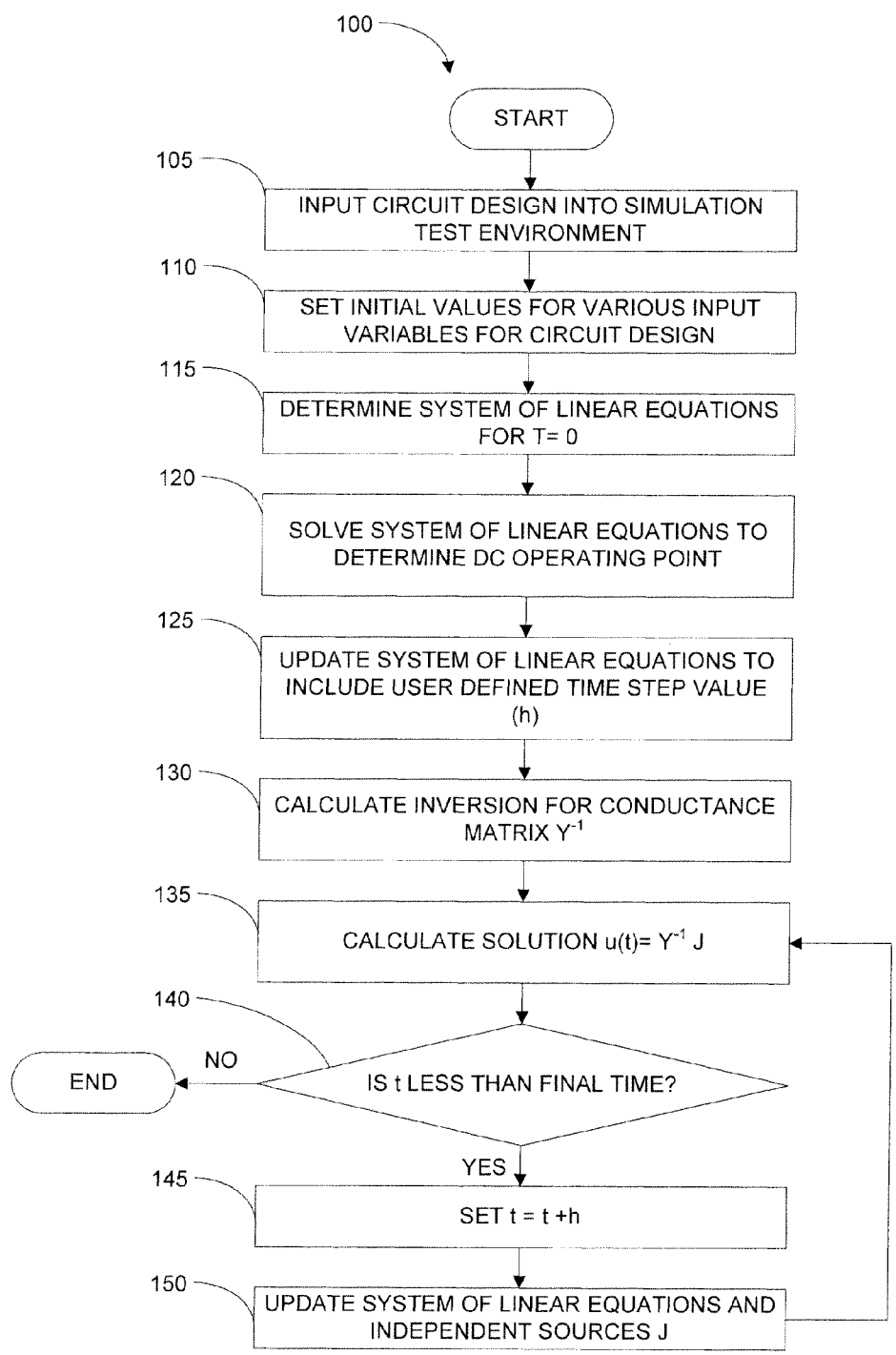
FIG. 1 is a flowchart diagram that illustrates the method operations performed in a typical power grid analysis in accordance with one embodiment of the present invention.

FIG. 1 is a flowchart diagram that illustrates the method operations 100 performed in a typical power grid analysis in accordance with one embodiment of the present invention. In an operation 105, the circuit design is input to the simulation environment (i.e., the test bench). Recall that each time the integrated circuit design is changed the new circuit design must be input into the test bench.

Figure 2A:
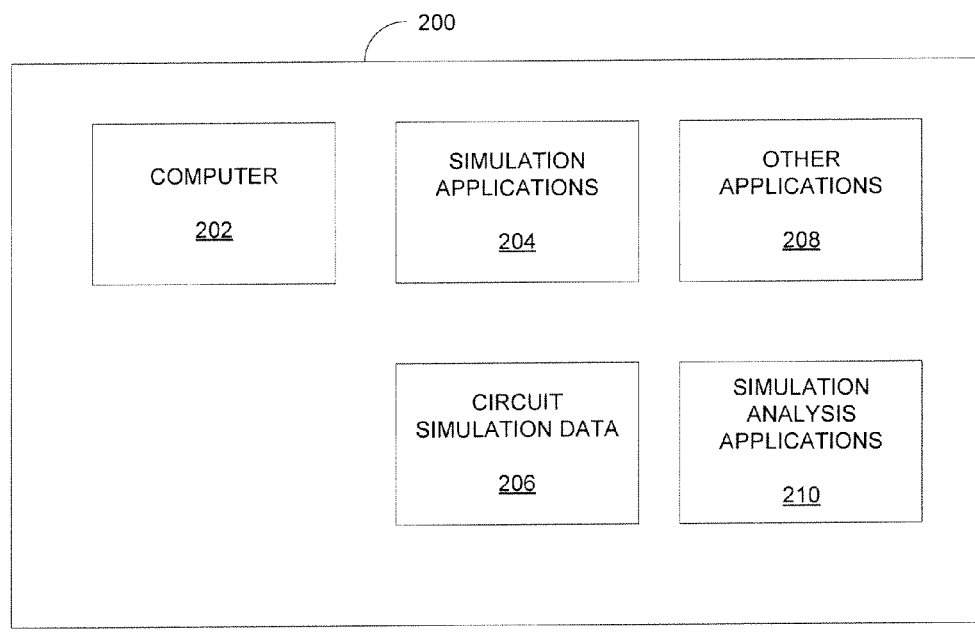
FIG. 2A is a block diagram of a test bench, in accordance with an embodiment of the invention.

FIG. 2A is a block diagram of a test bench 200, in accordance with an embodiment of the invention. The test bench 200 includes a computer 202, simulation applications 204, circuit simulation data 206 and other applications 208 as may be desired. The simulation applications 204 enable the test bench 200 to form and host the simulated circuits. The simulation applications 204 also enable the test bench 200 to simulated the operations of the circuit in a dynamic manner. The circuit simulation data 206 includes the circuit design data for the circuit being simulated and the input and operational variables that are needed for the circuit operation to be simulated. The other applications 208 provide other functionality for to enhance the usability of the test bench 200. By way of example, the other applications 208 can include specialized graphical representation applications to provide visual test results. The test bench 200 includes simulation analysis applications 210 that are needed to analyze the performance of the circuit being simulated.

Referring again to FIG. 1, in an operation 110, initial values for the various inputs variables for the circuit design are set. By way of examples, device states, timing, voltages, signals, etc. are input to the circuit simulation data 206.

In an operation 115, the current time t is set to 0 value for an initial time ($t_0$) of the operation of the circuit design. The circuit design is simplified into one or more RC equivalent circuits at the selected time value and each RC equivalent circuit is then described mathematically as a linear equation. The linear equations for each of the RC equivalent circuits, hereafter referred to as the system of linear equations, are stored in a matrix $Y_0$ for time $t_0$. In an operation 120, the system of linear equations is resolved to determine a DC operating point for when current time t is set to 0.

Figure 2B:
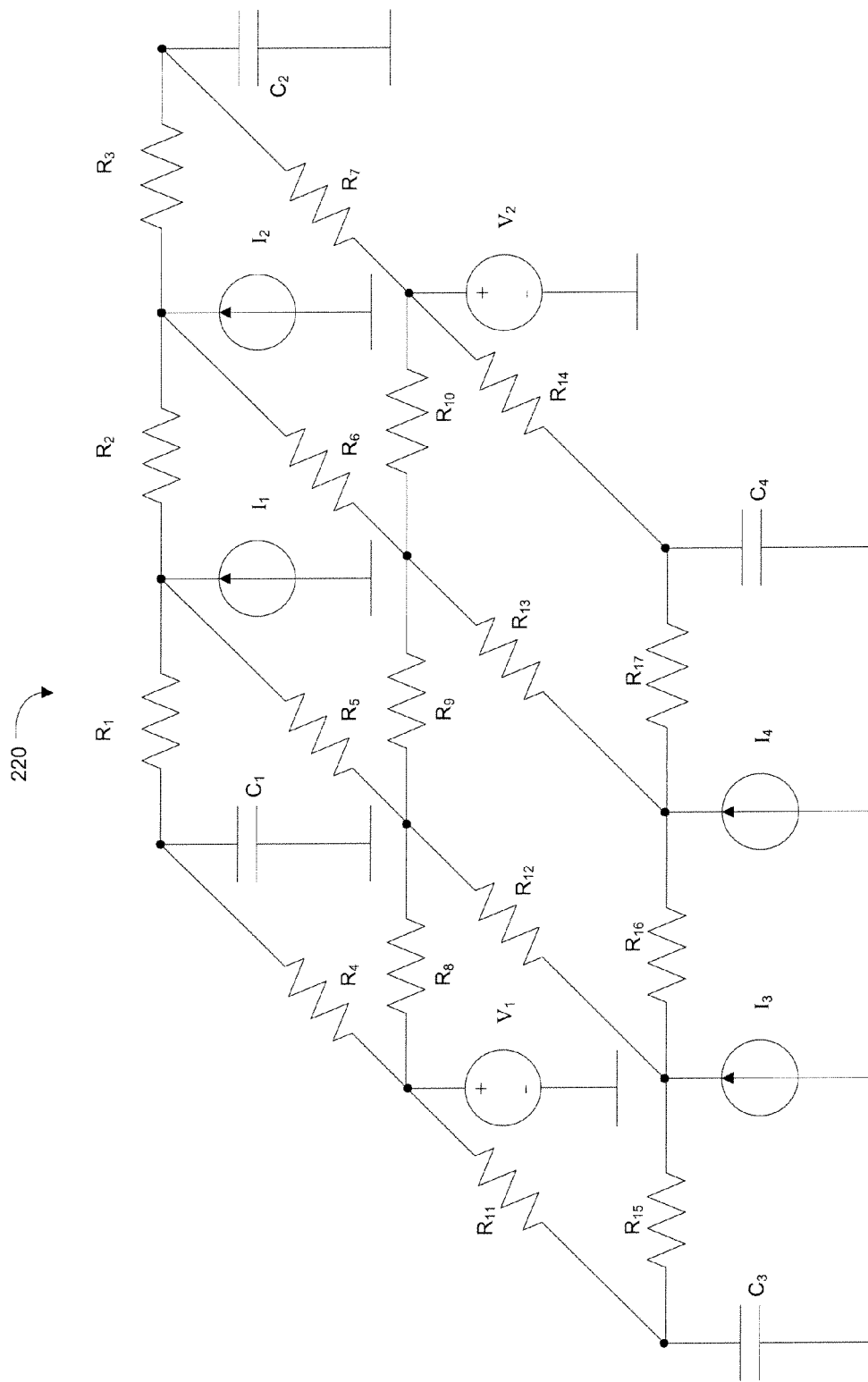
FIG. 2B is a schematic diagram of a power grid on an integrated circuit, in accordance with one embodiment of the present invention.

FIG. 2B is a schematic diagram of a power grid 220 on an integrated circuit, in accordance with one embodiment of the present invention. The devices in the power grid 220 are shown as resistive loads R1-R17, capacitive loads C1-C4, current sources I1-I4 and voltage sources V1-V2.

Figure 2C:
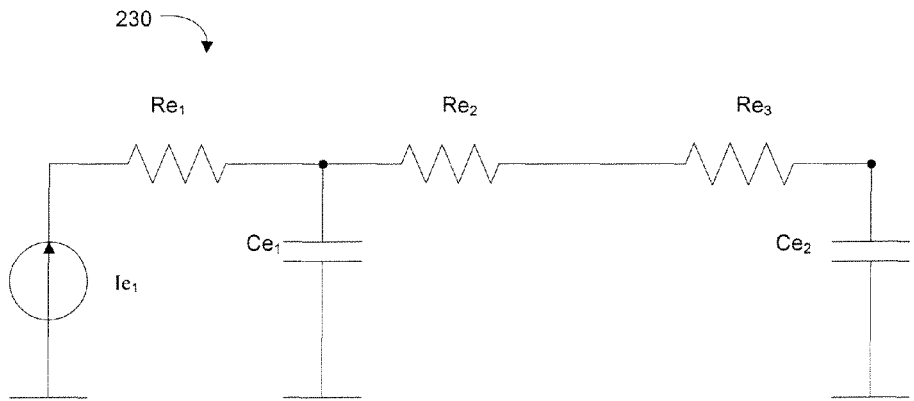
FIG. 2C is a schematic diagram of a simplified RC circuit of the power grid, in accordance with one embodiment of the present invention.

FIG. 2C is a schematic diagram of a simplified RC circuit 230 of the power grid 220, in accordance with one embodiment of the present invention. The simplified RC circuit 230 includes a current source $Ie_1$ and circuit loads represented as resistors $Re_1$, $Re_2$ and $Re_3$. Capacitance of the simplified RC circuit 230 is represented as capacitors $Ce_1$ and $Ce_2$. It should be understood that this is an exemplary simplified RC circuit and that some RC circuits could include more or less RC components than represented in simplified RC circuit 230.

Figure 2D:
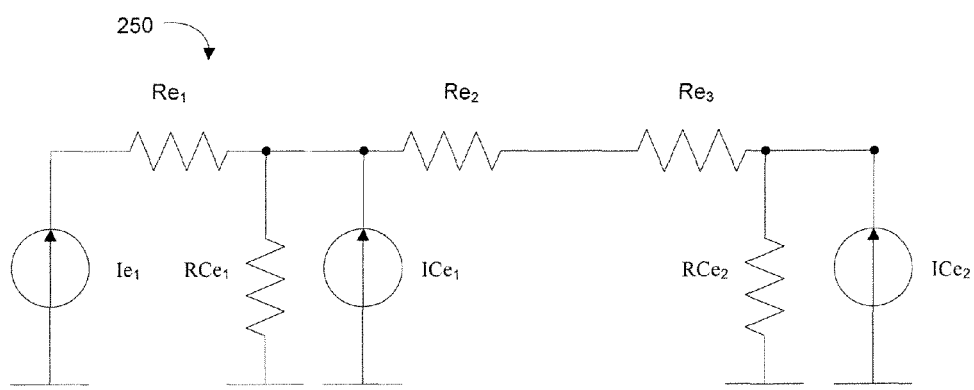
FIG. 2D is a schematic diagram of a discretized RC circuit of the simplified RC circuit, in accordance with one embodiment of the present invention.

FIG. 2D is a schematic diagram of a discretized RC circuit 250 of the simplified RC circuit 230, in accordance with one embodiment of the present invention. The discretized RC circuit 250 represents each capacitor in the simplified RC circuit 230 corresponding to the power grid circuit by each capacitor's time variant equivalent companion model. The discretized RC circuit 250 includes the current source $Ie_1$ and circuit loads represented as the resistors $Re_1$, $Re_2$ and $Re_3$. The capacitors $Ce_1$ and $Ce_2$ of the simplified RC circuit 230 are represented by or discretized into the resistive load equivalents and the signal current source equivalents. By way of example, capacitor Ce₁ is shown as the equivalent resistive load RCe1 and current source Ice1. Similarly, capacitor Ce₂ is shown as the equivalent resistive load RCe2 and signal current source Ice2.

Referring again to FIG. 1, in an operation 125, the system of linear equations is updated to include the changes that would occur inside the RC equivalent circuits at a second time $(t_1)=t+h$ where h is a time step value equal to the time between the current time t and the next simulated operation time when the state of the RC equivalent circuits will change. The time step value can be a user defined constant value or can be user defined for each step value in the timing sequence of the integrated circuit design. The updated system of linear equations is stored in a matrix $Y_1$ for time $t_1$.

In an operation 130, the matrix $Y_1$ of the updated system of linear equations is inverted to form matrix $Y_1^{-1}$. The matrix $Y_1^{-1}$ can be used to determine the conductance at time $t_1$.

In operation 135, the matrix $Y_1^{-1}$ can be resolved to determine a solution. The solution can include the node voltage values for the RC equivalent circuits. The node voltage values for the RC equivalent circuits are then stored (e.g., in the memory system of the test bench).

In an operation 140, the then current time t is compared to an end or final simulation time $t_f$. If current time $t \geq t_f$ then the method operations end. If current time $t < t_f$ then the method operations continue in an operation 145.

In operation 145, the current time t is set to t+h and the method operations continue in an operation 150.

In operation 150, the system of linear equations is updated to accommodate changes that would reflect capacitor model changes associated with time step variance. The system of linear equations can also be updated to include changes that would reflect possible independent source values modification. The method operations continue in operation 135 described above.

The complexity of the system linear equations in the matrix Y increases as the number of devices in the integrated circuit increases. By way of example each of the linear equations includes more variables and therefore become more complex and/or the number of linear equations in the matrix Y increases. Further, each operating time or time step must be analyzed and as the number of devices in the integrated circuit increases the number of time steps can also increase. As a result, the number of times that the matrix Y must be resolved or inverted and resolved increases several fold as the number of devices in the integrated circuit increases. Further still, as the number of devices in the integrated circuit increases the number of design changes increases. Each new design change requires a corresponding new power grid analysis.

As each new power grid analysis requires additional complexity it also requires more time for the test bench 200 to complete the simulation and analysis. There have been several approaches to reducing the power grid analysis work load but most result in an unacceptable level of estimation. For example a constant time step can reduce some of the required calculations however, to provide the level of accuracy needed, the constant time step must be very short. As a result many linear equations systems must be resolved. Another approach is to reduce the size of the logical block being analyzed. However, that leads into excess errors when the logic blocks are recombined.

One embodiment of the present invention accounts for a time step variation by noting that the conductance of each capacitor of an RC equivalent circuit varies due to that capacitors charge/discharge cycle. As a result, the portion of the power demand on the power grid that is attributable to the capacitors for a selected time step can be calculated once and then reused whenever a subsequent time step that is equal to or sufficiently close to being equal to the selected time step.

Large change sensitivities can be used to define a relatively small portion of the matrix of linear equations. This defined portion of the matrix of linear equations corresponds to the portion of the matrix associated with node capacitors which depends on each time step change. Only this defined portion of the matrix of linear equations needs to be inverted for each time step change, instead of inverting the entire matrix. Inverting only the defined portion of the matrix of linear equations significantly reduces the processing time required to calculate the node voltages. This approach can be used for large or small time step changes.

An ordinary (i.e., small change) sensitivity is a fractional change of a function with respect to the fractional change of a parameter. By way of example, if the fractional change is infinitely small (i.e. approaching zero), the sensitivity becomes a derivative value. Alternatively, when the fractional change of a parameter (e.g. a time step), is not a small change but is rather a large change in value can therefore be referred to as a large change sensitivity.

An ordinary sensitivity calculation is not necessarily accurate enough and therefore a large change sensitivity calculation can be used to more accurately determine the affects of a large change of the parameter. By way of example, as the conductance of a capacitor is a function of the magnitude of the time step, then a large time step change will cause a corresponding larger change in the capacitive conductance rather than another dynamic features of the circuit. Alternatively, if the time step change approaches zero, then the corresponding change in the capacitive conductance is a small or minimal change. As a result, that portion of the matrix corresponding to capacitive conductance and be reused if a previously calculated time step is substantially the same duration as the current time step.

The inversion entire matrix of linear equations is performed one time and then stored. An inversion of the defined portion of the matrix of linear equations is completed multiple times. The number of times the inversion of the defined portion of the matrix of linear equations is completed can be further limited to only iterations when the integration time step is changed. The inverse of the defined portion of the matrix of linear equations and the inverse of full matrix of linear equations can be combined according to a large change sensitivities technique as described in more detail below. The time step can be selected based on a user defined accuracy requirement, (i.e., local truncation error as described in more detail below). Time step is evaluated at each simulation time.

Figure 3:
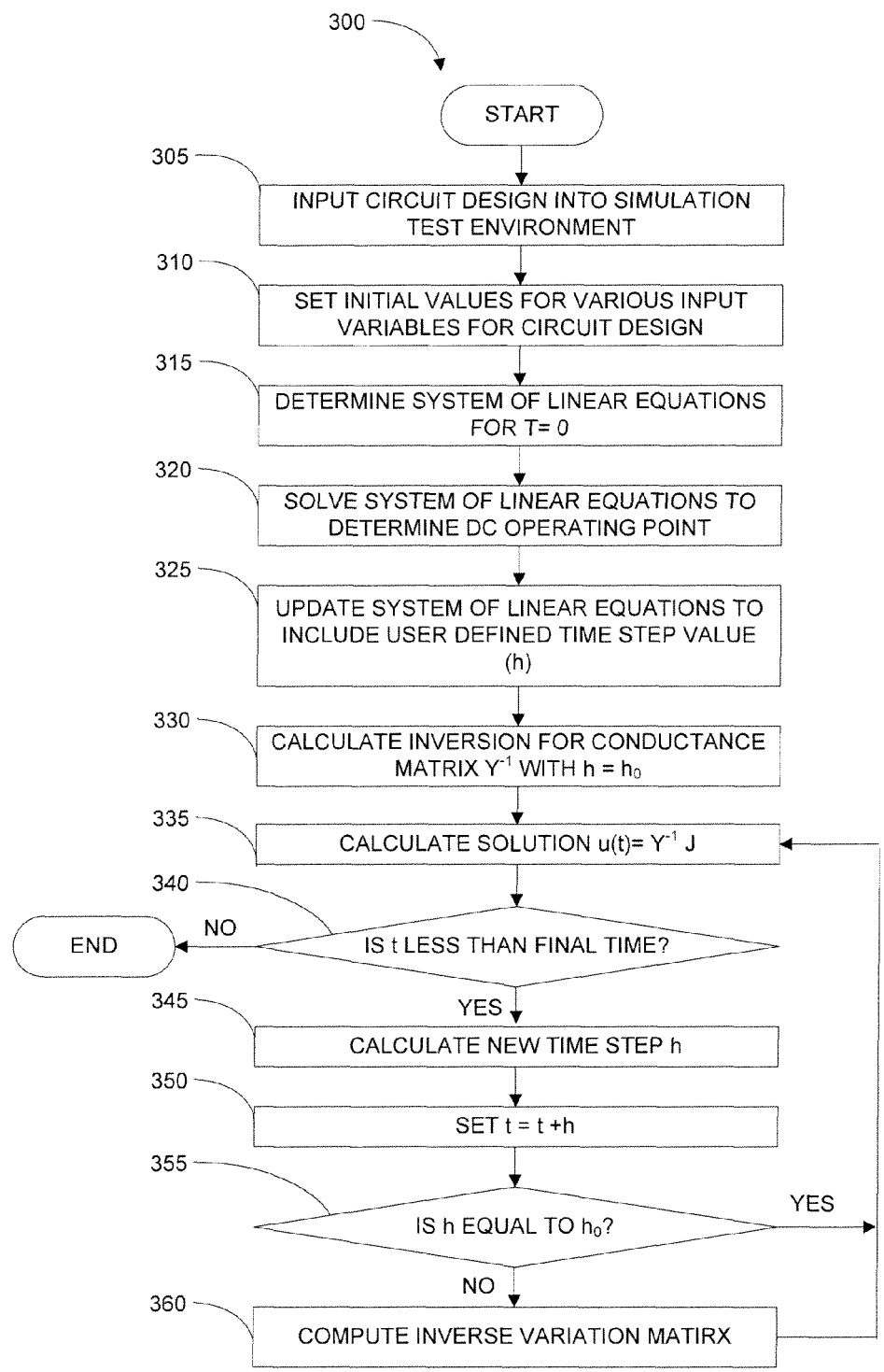
FIG. 3 is a flowchart diagram that illustrates the method operations performed in a power grid analysis in accordance with one embodiment of the present invention.

FIG. 3 is a flowchart diagram that illustrates the method operations 300 performed in a power grid analysis in accordance with one embodiment of the present invention. In an operation 305, the circuit design is input to the simulation environment (i.e., the test bench 200).

In an operation 310, initial values for the various inputs variables for the circuit design are set. By way of examples, device states, timing, voltages, signals, etc. are input to the circuit simulation data 206.

In an operation 315, the current time t is set to 0 value for an initial time ($t_0$) of the operation of the circuit design. The power grid circuit design is represented as one or more RC equivalent circuits and each RC equivalent circuit is then described mathematically as a linear equation. Each capacitor in the RC circuit corresponding to the power grid circuit design is represented by the each capacitor's respective time variant equivalent companion model (e.g., a load and current source corresponding to the specific time). The system of linear equations, are stored in a matrix $Y_0$ for time $t_0$. In an operation 320, the system of linear equations is resolved to determine a DC operating point for when current time t is set to 0.

In an operation 325, the system of linear equations is updated to include the changes that would occur inside the RC equivalent circuits at a second time $(t_1)$=t+h where h is a time step value equal to the time between the current time t and the next simulated operation time when the state of the RC equivalent circuits will change. The time step value can be a user defined constant value or can be user defined for each step value in the timing sequence of the integrated circuit design. The updated system of linear equations is stored in a matrix $Y_1$ for time $t_1$.

In an operation 330, the matrix $Y_1$ of the updated system of linear equations is inverted to form matrix $Y_1^{-1}$. The matrix $Y_1^{-1}$ can be used to determine the conductance at time $t_1$.

In an operation 335, the matrix $Y_1^{-1}$ can be resolved to determine a solution. The solution can include the node voltage values for the RC equivalent circuits. The node voltage values for the RC equivalent circuits are then stored (e.g., in the memory system of the test bench 200).

In an operation 340, the then current time t is compared to an end or final simulation time $t_f$. If current time $t \geq t_f$ then the method operations end. If current time $t < t_f$ then the method operations continue in an operation 345.

In operation 345, a new time step h is calculated. In an operation 350, the current time t is set to t+h and the method operations continue in an operation 355.

In an operation 355, the new time step h is compared to the previous time steps stored from previous iterations. The number of times the defined portion of the matrix of linear equations is inverted can also be reduced. The current time step for the defined portion of the matrix of linear equations can be rounded. If there is previously calculated time step sufficiently close enough to the current time step but smaller than the current time step, then the inversion of the defined portion of the matrix of linear equations corresponding to the previously calculated time step can be used. Thereby avoiding an inversion of the defined portion of the matrix of linear equations corresponding to the current time step. The difference between the current time step and the previously calculated time step can be a user defined value.

Comparing the new time step h to the previous time steps in operation 355 can include determining a time step difference $\Delta h$ between the new time step h to the previous time steps. If the time step difference $\Delta h$ is less than or equal to a user selected small change value (i.e., local truncation error) then the method operations continue in operation 335. If the time step difference $\Delta h$ is greater than the user selected local truncation error then the method operations continue in operation 360.

In operation 360, the system of linear equations is updated to accommodate changes that would reflect capacitor model changes associated with time step variance. The system of linear equations can also be updated to include changes that would reflect possible independent source values modification. The method operations continue in operation 335 described above.

Figure 4:
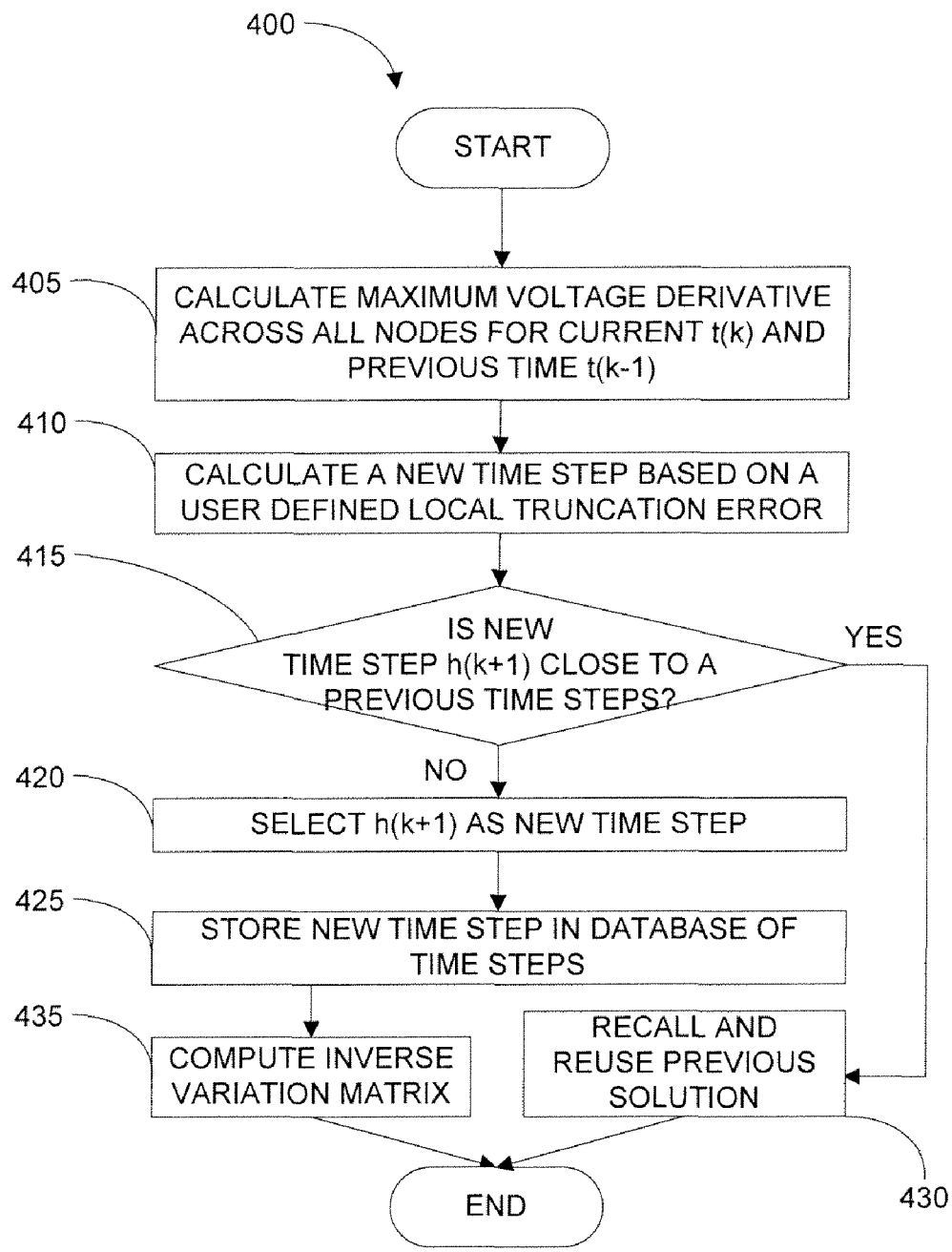
FIG. 4 is a flowchart diagram that illustrates the method operations performed in a power grid analysis operation 355 of FIG. 3, in accordance with one embodiment of the present invention.

FIG. 4 is a flowchart diagram that illustrates the method operations 400 performed in a power grid analysis operation 355 of FIG. 3, in accordance with one embodiment of the present invention. In an operation 405, the maximum voltage derivative across all nodes for current time step and for all previous time steps is stored in a database in the memory system of the test bench 200.

In an operation 410, a new time step is determined based on the user defined local truncation error. In operation 415, the new time step is compared to the previously stored time steps. If in operation 415, the difference between the new time step and a previously stored time step is greater than the user defined local truncation error then the method operations continue in an operation 420.

In operation 420, the new time step is selected as a new time step and in an operation 425, the new time step is stored in the database of time steps.

In an operation 435, the new time step is used as the current time step and the corresponding portion of the matrix Y is inverted and resolved and the resolved solution stored in the database of time steps corresponding to the current time step value and the method operations can end.

If in operation 415, the difference between the new time step and a previously stored time step is less than or equal to the user defined local truncation error then the method operations continue in an operation 430. In operation 430, the previously calculated solution corresponding to the previous time step in the database is recalled and reused.

A typical system of N linear equations, representing the RC equivalent circuit discretized at time t is equal to:

$$Y(h)*u(t)=J(t)$$

Y is an equivalent conductance matrix u is a vector of unknown voltages and currents J is a vector of input excitations t is a given time h is a time step $h=t-t_p$, and $t_p$ is a previous simulation time.

Solution is given as follows:

$$u(t)=Y^{-1}(h)*J(t)$$

If time step h remains unchanged, then $Y^{-1}(h)$ can be computed one time, and reused for any time t, $t_s<t<=t_f$, where $t_s$ is a start time, $t_f$ is a total simulation time.

If time step h changed, then a modified system of linear equations, representing RC equivalent circuit at time t:

$Y(h+\Delta h)*u(t)=J(t)$, where $Y(h+\Delta h)$ is a variation matrix representing changes to the typical matrix $Y(h)$ described above.

Variation matrix N×N can be represented as a diagonal matrix M×M multiplied by incidence matrix P of size N×M, and incidence matrix Q of size M×N:

$Y(h+\Delta h)=Y(h)+P*Y(h, \Delta h)*Q$ where M is a number of modified diagonal entries in $Y(h+\Delta h)$ The solution is given as follows:

$$u(t)=Y^{-1}(h+\Delta h)*J(t)=(Y(h)+P*Y(h,\Delta h)*Q^T)^{-1}*$$
$$J(t)=Y^{-1}(h)*(1+Q^T*Y^{-1}(h)*P*Y(h,\Delta h))^{-1}*J(t)$$

If M is much less than N, then:

(a) complexity to invert $(1+Q^T*Y^{-1}(h)*P*Y(h, \Delta h))$ is much less than complexity to invert $Y(h)$, because both $Y(h, \Delta h)$ and $Q^T*Y^{-1}(h)*P$ has size M×M.

(b) $Y^{-1}(h)$ and $Q^T*Y^{-1}(h)*P$ can be reused for any arbitrary time t, $t_s<t<=t_f$ however $(1+Q^T*Y^{-1}(h)*P*Y(h, \Delta h))^{-1}$ needs to be computed every time h has changed.

Original system of linear equations discretized at arbitrary time t is shown in Matrix 1 as follows:

$$\begin{vmatrix} -1/R_1 & 1/R_1 & 0 & 0 \\ 1/R_1 & -1/R_1-1/R_2-C_1/h & 1/R_2 & 0 \\ 0 & 1/R_2 & -1/R_2-1/R_3 & 1/R_3 \\ 0 & 0 & 1/R_3 & -1/R_3-C_2/h \end{vmatrix} * \begin{vmatrix} u_1 \\ u_2 \\ u_3 \\ u_4 \end{vmatrix} = \begin{vmatrix} i_1 \\ i_{C1} \\ 0 \\ i_{C2} \end{vmatrix} \quad \text{Matrix 1}$$

Modified system of linear equations with a time step variation is shown in Matrix 2:

$$\begin{vmatrix} -1/R_1 & 1/R_1 & 0 & 0 \\ 1/R_1 & \begin{matrix}-1/R_1-1/R_2-C_1/h+\\ C_1\Delta h/(h+\Delta h)\end{matrix} & 1/R_2 & 0 \\ 0 & 1/R_2 & -1/R_2-1/R_3 & 1/R_3 \\ 0 & 0 & 1/R_3 & \begin{matrix}-1/R_3-C_2/h+\\ C_2\Delta h/(h+\Delta h)\end{matrix} \end{vmatrix} * \begin{vmatrix} \tilde{u}_1 \\ \tilde{u}_2 \\ \tilde{u}_3 \\ \tilde{u}_4 \end{vmatrix} = \begin{vmatrix} \tilde{i}_1 \\ \tilde{i}_{C1} \\ 0 \\ \tilde{i}_{C2} \end{vmatrix} \quad \text{Matrix 2}$$

Modified equivalent conductance matrix $Y(h+\Delta h)$ can be split into the sum of the original matrix $Y(h)$ and the variation matrix $P*Y(h, \Delta h)*Q^T$ as follows in Matrices 3-5:

$$Y(h) = \begin{vmatrix} -1/R_1 & 1/R_1 & 0 & 0 \\ 1/R_1 & -1/R_1-1/R_2-C_1/h & 1/R_2 & 0 \\ 0 & 1/R_2 & -1/R_2-1/R_3 & 1/R_3 \\ 0 & 0 & 1/R_3 & -1/R_3-C_2/h \end{vmatrix} \quad \text{Matrix 3}$$

$$P*Y(h,\Delta h)*Q^T = \begin{vmatrix} 0 & 0 \\ 1 & 0 \\ 0 & 0 \\ 0 & 1 \end{vmatrix} * \begin{vmatrix} C_1\Delta h/(h+\Delta h) & 0 \\ 0 & C_2\Delta h/(h+\Delta h) \end{vmatrix} * \begin{vmatrix} 0 & 1 & 0 & 0 \\ 0 & 0 & 0 & 1 \end{vmatrix} = \quad \text{Matrix 4}$$

$$= \begin{vmatrix} 0 & 0 & 0 & 0 \\ 0 & C_1\Delta h/(h+\Delta h) & 0 & 0 \\ 0 & 0 & 0 & 0 \\ 0 & 0 & 0 & C_1\Delta h/(h+\Delta h) \end{vmatrix} \quad \text{Matrix 5}$$

If matrix $Z(h)$ is inverse of $Y(h)$, i.e., $Z(h)=Y^{-1}(h)$ then $Q^T*Y^{-1}(h)*P=Q^T*Z(h)*P$ can be computed as follows in Matrix 6:

$$\begin{vmatrix} 0 & 1 & 0 & 0 \\ 0 & 0 & 0 & 1 \end{vmatrix} * \begin{vmatrix} Z_{11} & Z_{12} & Z_{13} & Z_{14} \\ Z_{21} & Z_{22} & Z_{23} & Z_{24} \\ Z_{31} & Z_{32} & Z_{33} & Z_{34} \\ Z_{41} & Z_{42} & Z_{43} & Z_{44} \end{vmatrix} * \begin{vmatrix} 0 & 0 \\ 1 & 0 \\ 0 & 0 \\ 0 & 1 \end{vmatrix} = \begin{vmatrix} Z_{22} & Z_{24} \\ Z_{42} & Z_{44} \end{vmatrix} \quad \text{Matrix 6}$$

Local truncation error (LTE) can be calculated as follows:

$V(k)=V(k-1)+h(k)*dV(k-1)/dt+(½)*h^2(k)*d^2V(k-1)/dt^2+\ldots$

Approximation based on local series truncation:

$\tilde{V}(k)=V(k-1)+h(k)*dV(k-1)/dt$

Local truncation error (E) can be calculated as follows:

$V(k)-\tilde{V}(k)=(½)*h^2(k)*d^2V(k-1)/dt^2=(½)*h(k)*dV(k)/dt-dV(k-1)/dt$

Where $d^2V(k-1)/dt^2=(1/h(k))*(dV(k)/dt-dV(k-1)/dt)$

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Figure 5:
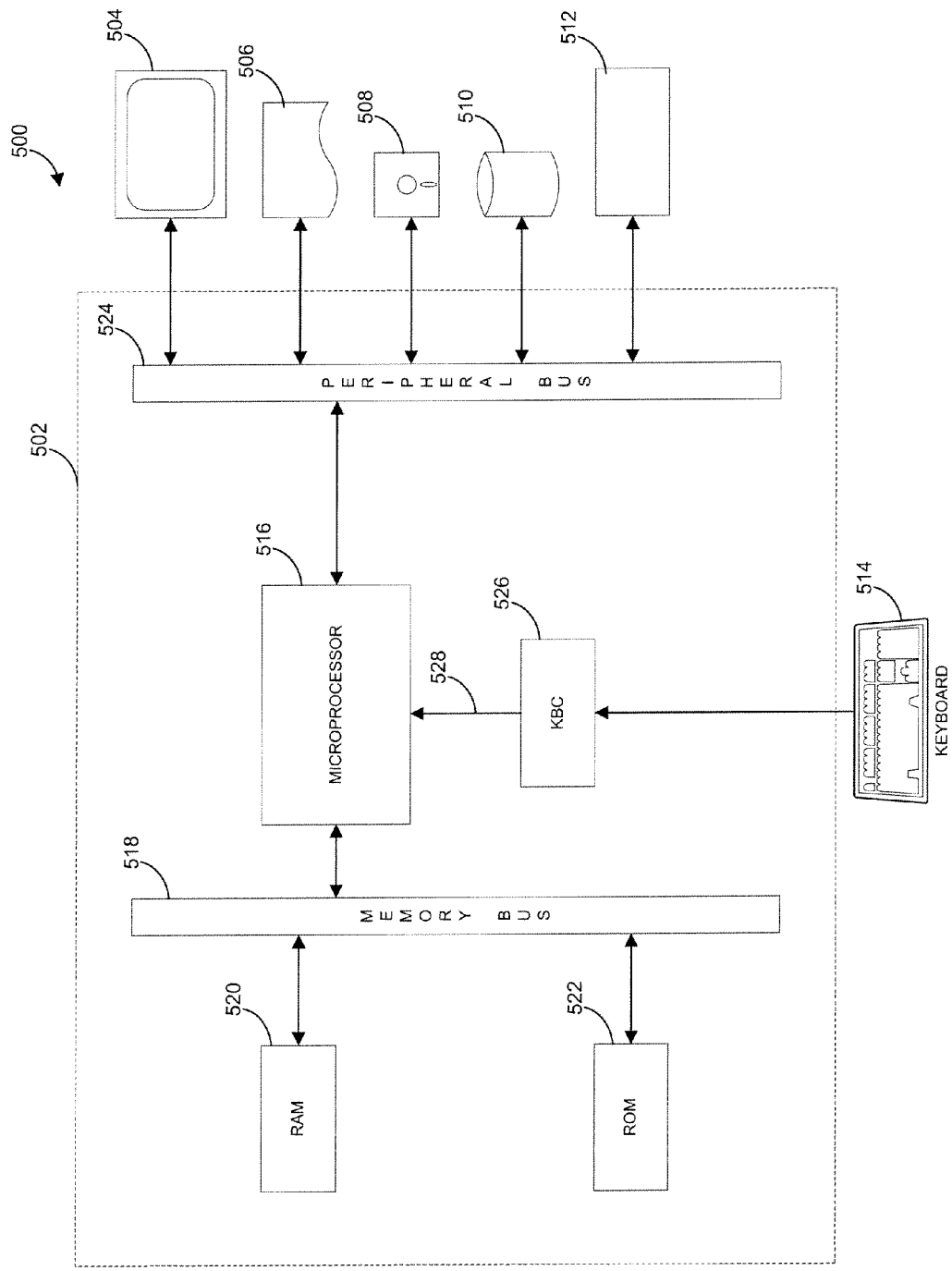
FIG. 5 is a block diagram of an exemplary computer system for carrying out the processing according to an embodiment of the invention.

FIG. 5 is a block diagram of an exemplary computer system 500 for carrying out the processing according to an embodiment of the invention. The computer system 500 could be used as the computer 202 in the test bench 200 described in FIG. 2A above. The computer system 500 includes a digital computer 502, a display screen (or monitor) 504, a printer 506, a floppy disk drive 508, a hard disk drive 510, a network interface 512, and a keyboard 514. The digital computer 502 includes a microprocessor 516, a memory bus 518, a peripheral bus 524, an input/output system including, among other components, a keyboard controller (KBC) 526 and keyboard and related input/output devices (e.g., mouse, trackball, touchpad, biometric input device, etc.). The computer also includes a memory system including a random access memory (RAM) 520, read only memory (ROM) 522. The digital computer 502 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 516 is a general purpose digital processor, which controls the operation of the computer system 500. The microprocessor 516 can be a single-chip processor or can be implemented with multiple components. Using instructions retrieved from memory, the microprocessor 516 controls the reception and manipulation of input data and the output and display of data on output devices.

The memory bus 518 is used by the microprocessor 516 to access the RAM 520 and the ROM 522. The RAM 520 is used by the microprocessor 516 as a general storage area and as scratch-pad memory, and can also be used to store input data and processed data. The ROM 522 can be used to store instructions or program code followed by the microprocessor 516 as well as other data.

The peripheral bus 524 is used to access the input, output, and storage devices used by the digital computer 502. In the described embodiment, these devices include the display screen 504, the printer device 506, the floppy disk drive 508, the hard disk drive 510, and the network interface 512. The keyboard controller 526 is used to receive input from keyboard 514 and send decoded symbols for each pressed key to microprocessor 516 over bus 528.

The display screen 504 is an output device that displays images of data provided by the microprocessor 516 via the peripheral bus 524 or provided by other components in the computer system 500. The printer device 506, when operating as a printer, provides an image on a sheet of paper or a similar surface. Other output devices such as a plotter, typesetter, etc. can be used in place of, or in addition to, the printer device 506.

The floppy disk drive 508 and the hard disk drive 510 can be used to store various types of data. The floppy disk drive 508 facilitates transporting such data to other computer systems, and hard disk drive 510 permits fast access to large amounts of stored data.

The microprocessor 516 together with an operating system operate to execute computer code and produce and use data. The computer code and data may reside on the RAM 520, the ROM 522, or the hard disk drive 510. The computer code and data could also reside on a removable program medium and loaded or installed onto the computer system 500 when needed. Removable program media include, for example, CD-ROM, PC-CARD, floppy disk and magnetic tape.

The network interface 512 is used to send and receive data over a network connected to other computer systems. An interface card or similar device and appropriate software implemented by the microprocessor 516 can be used to connect the computer system 500 to an existing network and transfer data according to standard protocols.

The keyboard 514 is used by a user to input commands and other instructions to the computer system 500. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code and/or logic on a computer readable medium. The computer readable medium is any data storage device that can store data which can thereafter be read by a computer system. Examples of the computer readable medium include hard drives, network attached storage (NAS), logic circuits, read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of analyzing a power grid in an integrated circuit comprising:
   inputting a circuit design to a test bench;
   inputting a plurality of initial values for the circuit design in to the test bench;
   setting a current time t to 0 value for an initial time ($t_0$) of the operation of the circuit design;
   representing each capacitor in an RC circuit corresponding to the power grid circuit design by the each capacitor's respective time variant equivalent companion model;
   describing each one of the plurality of RC equivalent circuits mathematically as one of a corresponding plurality of linear equations;
   storing the plurality of linear equations in a matrix $Y_0$ for time $t_0$;
   resolving the matrix $Y_0$ to determine a DC operating point;
   updating the RC equivalent circuits and the corresponding plurality of linear equations at a second time step $t_1 = t + h$ where h is a time step value equal to the current time t and a next simulated operation time;
   storing the updated plurality of linear equations in a matrix $Y_1$ for time $t_1$;
   inverting the matrix $Y_1$ to form inverted matrix $Y_1^{-1}$;
   resolving the inverted matrix $Y_1^{-1}$;
   calculating a new time step and setting the current time t to t+h;
   comparing the new time step h to a plurality of time steps in a time step database;
   selecting one of the plurality of time steps substantially equal to the new time step; and
   recalling a solution corresponding to the selected time step.

2. The method of claim 1, wherein comparing the new time step h to the plurality of time steps in the time step database includes calculating a time step difference.

3. The method of claim 2, wherein calculating the time step difference includes selecting a local truncation error.

4. The method of claim 3, wherein calculating the time step difference further includes:
determining a difference between each one of the plurality of time steps and the current time step; and
selecting one of the plurality of time steps that has a corresponding difference less than or equal the local truncation error.

5. The method of claim 1, wherein recalling the solution corresponding to the selected time step includes resolving the matrix using the recalled solution.

6. A method of analyzing a power grid in an integrated circuit comprising:
inputting a circuit design to a test bench;
inputting a plurality of initial values for the circuit design in to the test bench;
setting a current time t to 0 value for an initial time ($t_0$) of the operation of the circuit design;
representing each capacitor in an RC circuit corresponding to the power grid circuit design by the each capacitor's respective time variant equivalent companion model;
describing each one of the plurality of RC equivalent circuits mathematically as one of a corresponding plurality of linear equations;
storing the plurality of linear equations in a matrix $Y_0$ for time $t_0$;
resolving the matrix $Y_0$ to determine a DC operating point;
updating the RC equivalent circuits and the corresponding plurality of linear equations at a second time step $t_1 = t+h$ where h is a time step value equal to the current time t and a next simulated operation time;
storing the updated plurality of linear equations in a matrix $Y_1$ for time $t_1$;
inverting the matrix $Y_1$ to form inverted matrix $Y_1^{-1}$;
resolving the inverted matrix $Y_1^{-1}$;
calculating a new time step and setting the current time t to t+h;
comparing the new time step h to a plurality of time steps in a time step database including:
calculating a time step difference;
selecting a local truncation error;
determining a difference between each one of the plurality of time steps and the current time step; and
selecting one of the plurality of time steps that has a corresponding difference less than or equal the local truncation error;
selecting one of the plurality of time steps substantially equal to the new time step;
recalling a solution corresponding to the selected time step; and
resolving the matrix using the recalled solution.

7. A system for analyzing a power grid in an integrated circuit comprising:
a computer;
computer readable logic for inputting a circuit design to the computer;
computer readable logic for inputting a plurality of initial values for the circuit design in to the test bench;
computer readable logic for setting a current time t to 0 value for an initial time ($t_0$) of the operation of the circuit design;
computer readable logic for representing each capacitor in an RC circuit corresponding to the power grid circuit design by the each capacitor's respective time variant equivalent companion model;
computer readable logic for describing each one of the plurality of RC equivalent circuits mathematically as one of a corresponding plurality of linear equations;
computer readable logic for storing the plurality of linear equations in a matrix $Y_0$ for time $t_0$;
computer readable logic for resolving the matrix $Y_0$ to determine a DC operating point;
computer readable logic for updating the RC equivalent circuits and the corresponding plurality of linear equations at a second time step $t_1 = t+h$ where h is a time step value equal to the current time t and a next simulated operation time;
computer readable logic for storing the updated plurality of linear equations in a matrix $Y_1$ for time $t_1$;
computer readable logic for inverting the matrix $Y_1$ to form inverted matrix $Y_1^{-1}$;
computer readable logic for resolving the inverted matrix $Y_1^{-1}$;
computer readable logic for calculating a new time step and setting the current time t to t+h;
computer readable logic for comparing the new time step h to a plurality of time steps in a time step database;
computer readable logic for selecting one of the plurality of time steps substantially equal to the new time step; and
computer readable logic for recalling a solution corresponding to the selected time step.

8. The system of claim 7, wherein the computer readable logic for comparing the new time step h to the plurality of time steps in the time step database includes computer readable logic for calculating a time step difference.

9. The system of claim 8, wherein the computer readable logic for calculating the time step difference includes the computer readable logic for selecting a local truncation error.

10. The system of claim 9, wherein the computer readable logic for calculating the time step difference further includes:
computer readable logic for determining a difference between each one of the plurality of time steps and the current time step; and
computer readable logic for selecting one of the plurality of time steps that has a corresponding difference less than or equal the local truncation error.

11. The system of claim 7, wherein the computer readable logic for recalling the solution corresponding to the selected time step includes computer readable logic for resolving the matrix using the recalled solution.

* * * * *